(12) United States Patent
Gao et al.

(10) Patent No.: US 6,572,796 B1
(45) Date of Patent: Jun. 3, 2003

(54) METHOD OF PREDICTING OPTIMAL INJECTION MOLDING CYCLE TIME

(75) Inventors: Dong-Ming Gao, Guilderland, NY (US); Wit Cezany Bushko, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 230 days.

(21) Appl. No.: 09/698,782

(22) Filed: Oct. 27, 2000

(51) Int. Cl.$^7$ ............................................. B29C 45/76
(52) U.S. Cl. ..................... 264/40.1; 264/40.4; 264/40.6; 264/40.7; 264/328.1; 264/336
(58) Field of Search ............................ 264/40.1, 328.1, 264/40.6, 40.4, 40.7, 336

(56) References Cited

U.S. PATENT DOCUMENTS

| | | | |
|---|---|---|---|
| 4,237,089 A | * 12/1980 | Kubat et al. | ............ 264/328.1 |
| 4,850,217 A | 7/1989 | Nunn | |
| 5,227,979 A | 7/1993 | Fukuhira et al. | |
| 5,591,385 A | * 1/1997 | Arai et al. | ............ 264/328.16 |
| 6,136,235 A | 10/2000 | Saito et al. | |

OTHER PUBLICATIONS

PCT International Search Report, International Application No. PCT/US 01/25522.
Roaek's Formulas for Stress and Strain, Warren C. Young, 6th Edition, McGraw–Hill, 1989.
Determination of Ejection Temperature Cooling Time in Injection Molding, C.J. Yu and J.L. Sutherland, Polymer Eng. and Sciences, vol. 32, pp. 191, 192.
An Experimental Study of Ejection Temperature and Cooling Time for Injection Molding, F.S. Lai, Y.S. Wang, H.H. Tseng, ANTEC '94 SPE, pp. 733, 1994.
Material Shrinkage in Molded Parts Caused by Time–Varying Cavity Presence, ANTEC '97, SPE, 1997, W.C. Bushko and V.K. Stokes.
How Long Can You Go? Optimizing the Cooling of Small Injection Molded Parts, B. Dowler L. Coppari, Plastic Engr., June, pp. 29, 1997.
Optimum Cooling System Design for the Injection Molding Process, S.J. Park and T. H. Kwon, Polymer Engr & Sci., vol. 38, pp 1450, 1998.
Effects of Cooling Time and Mold Temperature on Quality of Molding with Precision Control, S.Y. Yang and L. Lien, Adv in Polymer Tech., vol. 15, pp 289, 1966.
The Effects of Wall Friction on the Ejection of Pressed Ceramic Parts, B.J. Briscoe, S.L. Rough, Powder Technology 99, pp. 228, 1998.
Evaluation by Plastic–Elastic Theory of the Resistance of Hollow Cylindrical Die Casting Against Ejection, S. Aoyama, H. Sugitani, K.S. Sakamoto, and T. Umemura, J. of Japan, Light Metals, vol. 43, pp. 275, 1993.
Optimum Ejector System Design for Plastic Ejection Moulds, Z. Wang, K.S. Lee, J.Y.H. Fuh, Z. Li, Y. F. Zhang, A.Y.C. Nee and D.C.H. Yang, Int. J. of Computer Appl. In Technology, vol. 9, pp. 211, 1996.

* cited by examiner

Primary Examiner—Jill L. Heitbrink
Assistant Examiner—Monica A Fontaine
(74) Attorney, Agent, or Firm—S. Bruce Brown; Noreen C. Johnson

(57) ABSTRACT

A method of predicting optimal injection molding cycle time includes the steps of performing a thermal analysis through a thickness of a part made using an injection mold, calculating shrinkage as a function of cooling time, calculating friction forces between the part and mold, calculating ejection forces based on the coefficient of friction and the calculated shrinkage calculating the induced stress in selected high stress areas on the part, and comparing the induced stress with material yield stress to determine an optimal cycle time window within which the part can be ejected without being damaged.

14 Claims, 3 Drawing Sheets

METHOD OF PREDICTING OPTIMAL INJECTION MOLDING CYCLE TIME

BACKGROUND OF THE INVENTION

This invention relates to injection molding and, more particularly, to a method of predicting optimal injection molding cycle time.

Injection molding of parts made of thermoplastic material generally has three main phases: first, injection of material into the mold; second, packing and cooling of the material in the mold in forming the desired part, and third, ejection of the molded part from the mold. The molding cycle time is commonly referred to as the duration of time from the start of the injection phase to initiation of the ejection phase.

Ability to accurately predict molding cycle time is of paramount importance in injection molding, since it relates directly to the production rate and part quality. When cycle time exceeds the desired range, the production rate will be compromised. In some instances, due to excessively increased friction force, the part may exhibit brittle failure during ejection. Another possible situation is that the ejector pins can be damaged because the friction force exceeds the maximum ejection force that the machine can provide through the ejectors. If the part is ejected too early, only a thin layer of polymer is solidified and ejection may cause the part to be deformed permanently, which generally leads to surface defects. For most injection molders, cycle time is estimated through molding trials, which are very costly and time consuming. In testing a new material, it is even more difficult to determine a proper cycle time range due to lack of knowledge of the material behavior.

One prior art approach (used in research reported by: Yu et al. in *Polymer Eng. & Sci.,* Vol. 32, pp 191, 1992; Dowler et al. in *Plastics Engineering,* June, 1997, pp 29; and Yang et al. in *Polymer Technology,* Vol. 15, pp 289, 1996) to predicting cycle time is based on a simple thermal analysis across the thickness of the part. Heat Deflection Temperature, known as HDT, is used as the ejection criterion, and the cooling period in which the part is cooled to the ejection temperature is considered as the cycle time. The concept implied in this prior art approach is that the part reaches maximum stiffness when it is completely solidified, and it is presumed that no damage will occur if the part is ejected thereafter. Such approach provides good representation of the part stiffness increase as cooling takes place and it is generally accepted as a quick estimate for cycle time in pre-design phases.

This prior art approach has several drawbacks. First, since the part has non-uniform temperature through its thickness, it is nontrivial to define a cycle time based on a single temperature such as HDT. Either the maximum temperature or averaged temperature might be compared with the ejection temperature. For semi-crystalline materials, it is well known that HDT is not suited to represent the polymer transition from the liquid to the solid phase. Using HDT as the ejection criterion becomes ambiguous and yields unrealistic prediction of cycle time. Second, the most important requirement for determining molding cycle time is that the part be ejected without damage, e.g., no permanent deformation such as visible marks, part brittle failure, etc. This prior art approach considers only the cooling aspect of the injection molding process and therefore cannot account for the processing conditions which have significant effects on stress generated by ejection, as well as on cycle time. For instance, the packing pressure plays an important role in determining optimal cycle time. Effective packing will facilitate the ejection in reducing friction force between plastics and steel molds and potentially reduce the cycle time. Third, this prior art approach always predicts cycle time regardless of the ejector pin layout and part geometry. Poor design of ejector pin sizes and locations can often lead to high stress in certain areas of the part that exceed the polymer yield stress. Therefore, permanent deformation such as pin push marks and part failure can occur when ejection takes place even if the part is cooled to the ejection temperature.

Another prior art approach (employed in research reported by Lai et al. in *ANTEC '94, SPE,* pp 733, 1994) uses a stiffness criterion instead of ejection temperature. This prior art approach suggests that the part can be ejected even if it is only partially solidified. By doing so, the cycle time is reduced. Since the part stiffness, which is solely dependent on temperature, does not relate to processing conditions, part design or pin layout, the stiffness approach has the same drawbacks as the ejection temperature approach. Other related research is reported by: Park et al in *Polymer Eng. & Sci.,* Vol. 38, pp 1450, 1998; Briscoe et al. in *Powder Technology* 99, pp 228, 1998; Aoyama et al. in *J. of Japan Light Metals,* Vol. 43, pp 275, 1993; and Wang et al. in *J. of Computer Appl. In Technology,* Vol. 9, pp 211, 1996.

Consequently, need still exists for an innovation which will is overcome the drawbacks of the prior art approaches and provide an effective approach to prediction of optimal molding cycle time.

BRIEF SUMMARY OF THE INVENTION

In a preferred embodiment of the invention, an optimal injection molding cycle time prediction method, designed to satisfy the aforementioned need, is provided. In this method, the injection molding cycle time is defined as the time duration from the end of the injection phase to initiation of the part ejection phase, since a large portion (more than 75%) of the cycle time is composed of the packing and cooling phase. The injection time, mainly determined by the part size and machine capacity, represents only a small portion (less than 10%) of the total cycle time. Consequently, only the packing and cooling phase is considered and the temperature at the end of the injection phase is assumed to be uniform over the entire part for sake of simplicity.

To overcome the drawbacks of the prior art approaches, a preferred embodiment of the invention uses the material yield stress as the criterion for ejection and provides an integrated approach which includes calculating the stress, at different cooling times, in the selected critical areas which represent the highest stress regions in the part. Since the stress at ejection is governed by the combined effects of processing conditions, material properties and part/pin design, this integrated approach links thermal analysis, shrinkage and friction calculations. Analysis is performed over a wide range of the cooling times until the entire thickness reaches the mold temperature. Finally, the predicted stress traces are compared to the yield stress of the polymer to determine (1) if the part can be ejected without damage, and (2) if (1) is true, the upper and lower limits of the cycle time based on the interception points between induced stress and yield stress curves. Thus, instead of using cooling analysis to predict cycle time, the invention uses an integrated methodology to assess the dependency of cycle time on material properties, processing conditions and part/pin design.

In a preferred embodiment of the invention, a method of predicting optimal injection molding cycle time comprises the steps of: performing a thermal analysis through a thickness of a part made using an injection mold; calculating shrinkage as a function of cooling time; calculating friction force between the part and mold; calculating ejection forces based on the coefficient of friction and the earlier calculated shrinkage amount; selecting high stress areas in the part and calculating induced stress in such areas; and comparing the induced stress with material yield stress to determine an optimal cycle time window during which the part can be ejected without being damaged.

DETAILED DESCRIPTION OF THE INVENTION

Figure 1:
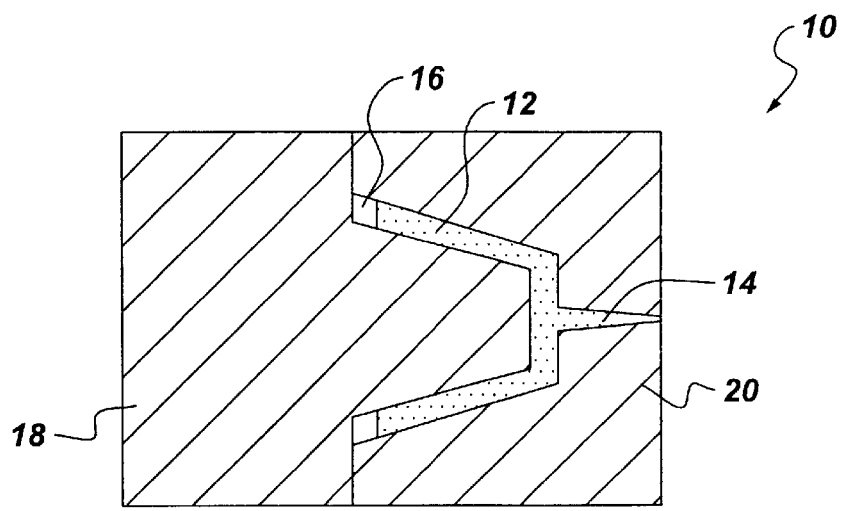
FIG. 1 is a schematic representation of an injection molding operation in an injection phase thereof.
Figure 2:
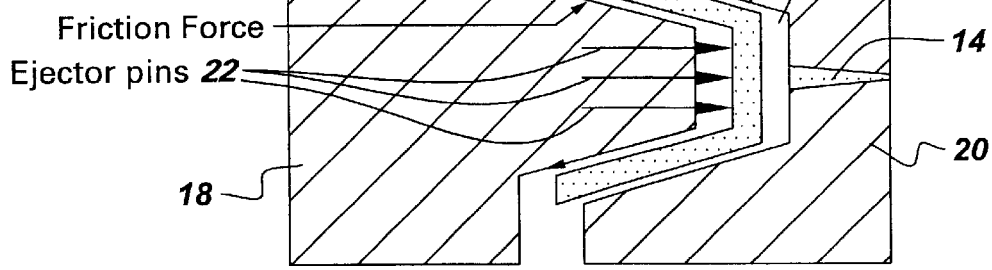
FIG. 2 is a schematic representation similar to FIG. 1 but showing the operation in an ejection phase thereof.

FIGS. 1 and 2 illustrate a conventional injection mold 10 engaged in injection molding of a plastic part 12. FIG. 1 depicts the position of mold 10 in a material injection phase of the injection molding process, whereas FIG. 2 depicts the position of mold 10 in a part ejection phase of the process.

The injection molding of plastic part 12 is a complex manufacturing process in which a polymer melt 14 flows into a cavity 16 of mold 10 formed by a pair of mated mold components 18, 20. In mold cavity 16, polymer melt 14 is transformed from liquid phase to solid phase and finally takes the shape of mold cavity 16. Due to shrinkage, plastic part 12 generally tends to deform inward toward one mold component 18 constituting a core of mold 10. Such shrinkage creates friction forces between the plastic part and core mold component 18 when the plastic part is ejected from the mold. Furthermore, since the friction force increases as part 12 cools down, large ejection forces are needed to remove the part from core mold component 18. Therefore, an arrangement of ejector pins 22, as depicted schematically in FIG. 2, is provided to overcome the friction and push plastic part 12 out of mold 10.

Surface defects or other types of permanent deformation caused by ejection occur generally in the pin push areas in the form of visible surface marks or extremely deformed areas. Such deformation can be explained by the fact that high stresses, induced in the pin push areas as pins 22 "hit" molded part 12, exceed the material yield stress. Therefore, the ejected part exhibits a post yield behavior. The direct cause for the generation of high stresses is the ejection force employed during the ejection phase to overcome the friction force between core mold component 18 and part 12.

The approach taken by the present invention is to evaluate the ejection force at different cooling times. In order to cover the potential cycle time window, the ejection force is calculated over a wide range of time until molded part 12 attains the completely cooled state. The ejection force is shown to be directly related to the friction force between part 12 and core component 18 of mold 10 which, in turn, depends on the part shrinkage, the coefficient of friction, and the elastic modulus of the polymer.

Figure 3:
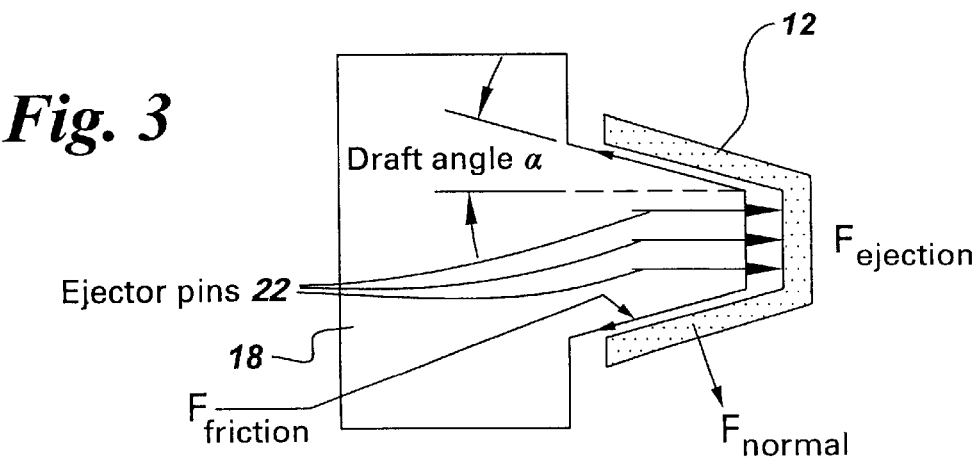
FIG. 3 is a schematic representation similar to FIG. 2 but indicating the forces exerted on the part at ejection.

FIG. 3 illustrates the relationship of the various forces involved during the ejection phase of the process. Assuming a draft angle α, the ejection force can be expressed as a function of the friction and normal forces based on the force equilibrium principle by neglecting the ejection inertia, $$F_{ejection} = F_{friction} \cos \alpha + F_{normal} \sin \alpha \quad \text{(Eq. 1)}$$

where $F_{friction}$ denotes the friction force and $F_{normal}$ represents the normal force mainly caused by part shrinkage.

The shrinkage at ejection can be calculated as, $$S_L = \alpha_L(T_g - T_{ej}(t)) - \gamma \tilde{p}_{eff}(t)$$

where $\alpha_L$ is the thermal expansion coefficient, $T_g$ is the transition temperature $T_{ej}$ is the temperature at ejection and $\gamma$ is a coefficient obtained from PVT constants, which represents the compressibility of the polymer.

$\tilde{p}_{eff}(t)$ is the effective pressure defined as:

$$\tilde{p}_{eff}(t) = \frac{1}{h}\int_{z(t)}^{h/2} p(z(t))dz + \frac{1}{h}\int_{-h/2}^{-z(t)} p(z(t))dz$$

where z(t) is the position of the liquid-solid interface based on the transition is temperature.

Since the draft angle is usually very small (less than a few degrees), the ejection force is mainly employed to overcome the friction force. Therefore, it is assumed that the ejection force is equal to the friction force which is proportional to the normal force, $$F_{ejection} = F_{friction} = \mu F_{normal} \quad \text{(Eq. 2)}$$

where the normal force $F_{normal}$ is a function of material thermal behavior and the amount of shrinkage induced during cooling.

Once the ejection force is obtained, the areas subject to high stress occurrence are selected. These areas are generally located in pin push areas or areas which represent some structural weakness such as grids, thin sections, etc., and are approximated with simple geometrics such as discs, beams with edges supported, etc. Using the basic stress-strain formula, the induced stress can be calculated in such areas. As the modulus of the polymer increases while the part undergoes rapid cooling, a temperature dependent modulus is used to represent the part stiffness variation. undergoes rapid cooling, a temperature dependent modulus is used to represent the part stiffness variation.

Since most of material properties and processing conditions are temperature/time dependent, thermal analysis is required to predict the cooling behavior of the polymer and further relate the part temperature profile to the cooling time.

Figure 4:
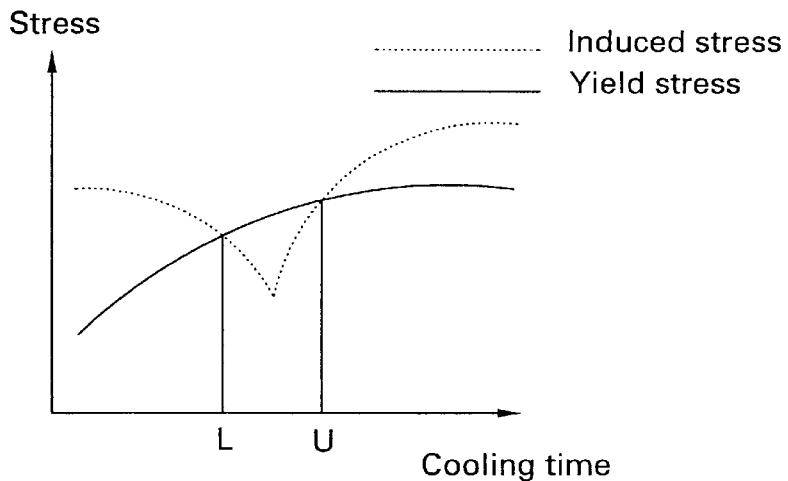
FIGS. 4 to 6 are graphs of injection mold cooling periods wherein induced stress is compared to material yield stress.
Figure 5:
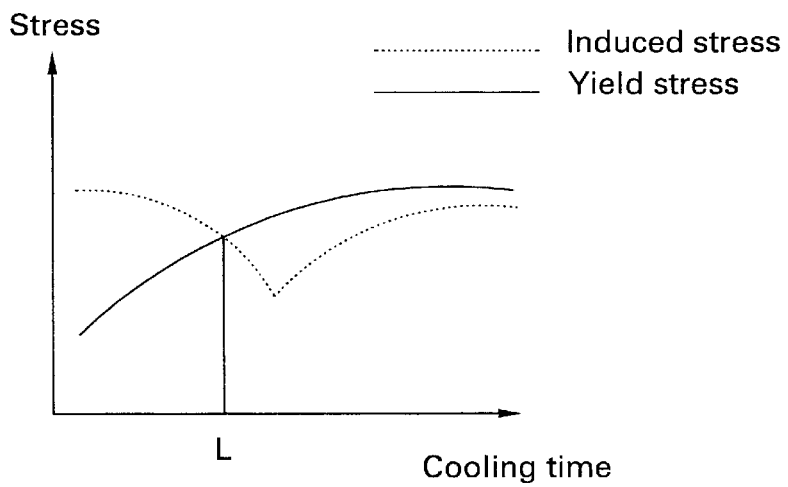
Figure 6:
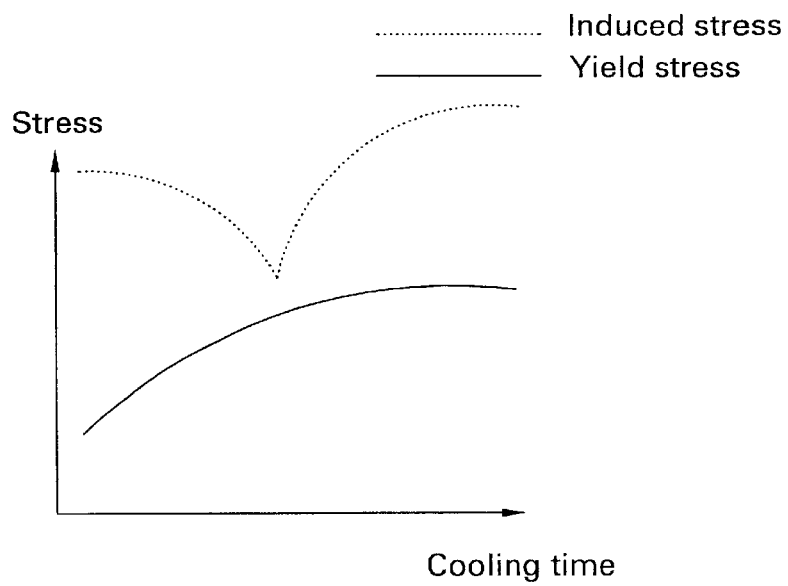

In order to detect occurrence of the permanent deformation, the material yield stress beyond which permanent deformation would take place needs to be defined. In a preferred embodiment of the invention, tensile stress-strain curves are employed to derive the yield stress as a function of temperature. FIGS. 4 to 6 show three possible situations for plastic part 12 shown in FIGS. 1–3 when the induced (actual) stress is compared to the material yield stress. In FIG. 4, the induced stress curve is shown to intercept the yield stress curve twice, which provides an upper limit U and lower limit L of the cycle time. As a result, an optimal cycle time window can be determined; i.e., if the part is ejected within such a window, the part is free of permanent deformation. In FIG. 5, as the thickness of the hardened layer increases, the induced stress is shown to decrease and, after reaching a minimum value, the induced stress remains lower than the yield stress as cooling continues. A lower limit L of the cycle time is thus established and part 12 can therefore be ejected any time after the lower limit. In FIG. 6, the induced stress is shown to be higher than the yield stress for the entire cooling cycle, so that no optimal cycle time exists; i.e., part 12 will fail at ejection regardless of the cycle time chosen. Another possible scenario is that the ejector pins will not be able to push part 12 out of the mold even when the maximum ejection force is reached.

Figure 7:
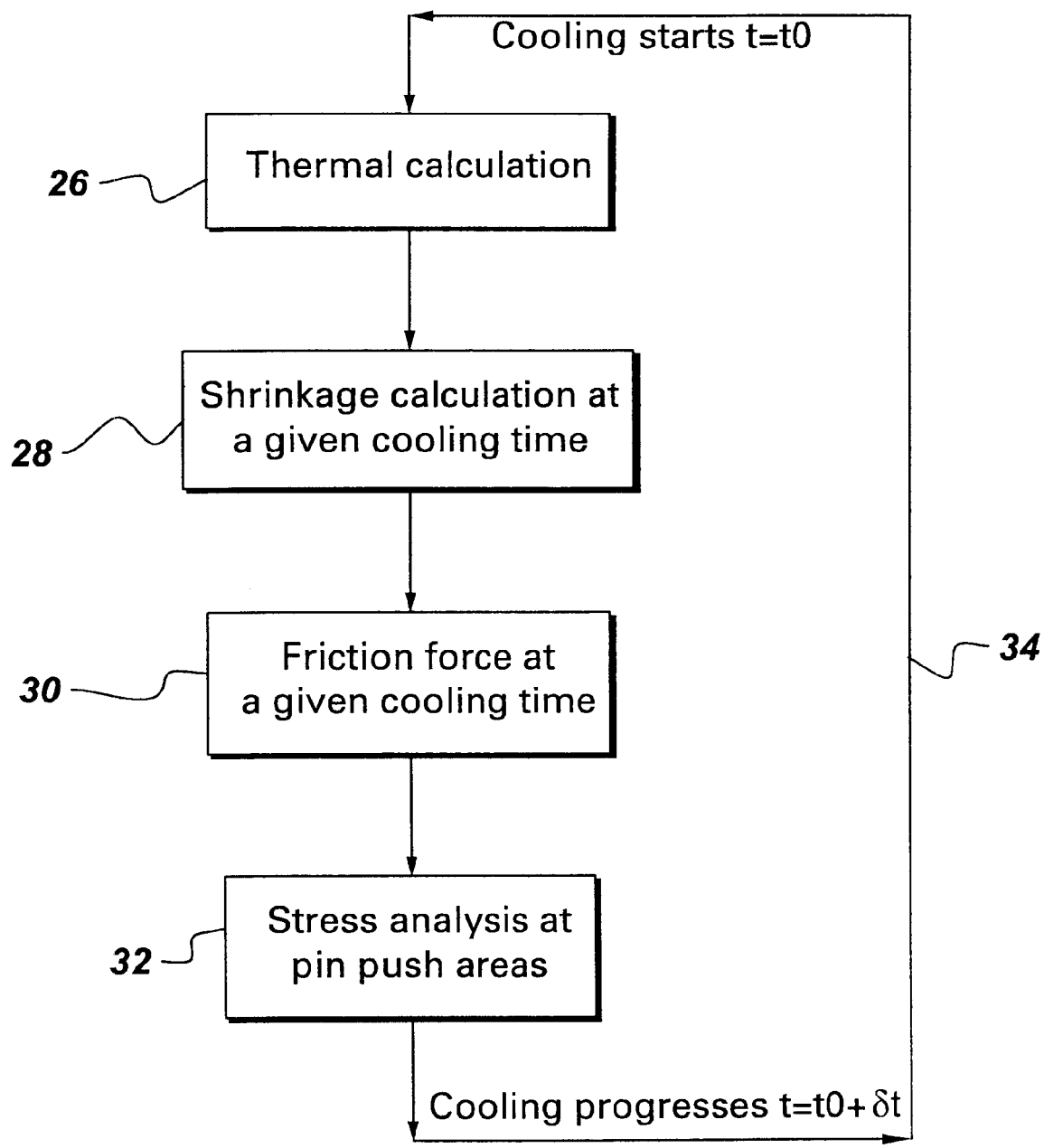
FIG. 7 is a flow diagram depicting a preferred embodiment of the optimal injection molding cycle time prediction method of the invention.

FIG. 7 is a flow diagram which summarizes the main calculation steps needed to calculate the friction force and induced stresses in selected areas described previously. At step 26, a thermal analysis is performed, using numerical schemes such as finite difference analysis, through a thickness of a part made using injection mold 10 shown in FIGS. 1 and 2. This analysis results in a determination of how rapidly the part is cooling. At step 28, shrinkage is calculated as a function of cooling time with transient material properties. At step 30, friction and ejection forces are calculated based on the coefficient of friction and shrinkage amount obtained at step 28. At step 32, high stress areas are selected in the part, such as pin push areas, and the induced stresses in such areas are calculated. These steps are repeated at different cooling times as represented by the return path 34 from step 32 to step 26. Once these calculations are completed at the different cooling times, the induced (or actual) stress is compared with material yield stress to determine an optimal cycle time window during which the part can be ejected without being damaged.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method of determining when to remove a part made of material that has been injection molded, from its mold, comprising the steps of:
   ascertaining shrinkage of the part as a function of cooling time;
   calculating ejection forces on the part based on the coefficient of friction between the part and the mold and the earlier ascertained shrinkage;
   calculating induced stress in selected high stress areas on the part; and
   comparing the induced stress with the material yield stress to determine an optimum cycle time window within which the part can be ejected without damage.

2. The method of claim 1 in which the selected high stress areas are stressed by ejector pins in the mold.

3. The method of claim 1 in which the optimal cycle time window includes upper and lower limits between which the part can be ejected without being damaged.

4. The method of claim 1 in which the optimal cycle time window includes a lower limit after which the part can be ejected without being damaged.

5. A method of predicting optimal injection molding cycle time, comprising the steps of:
   a) performing a thermal analysis through a thickness of a part made of material molded in an injection mold to ascertain how rapidly the part is cooling in the mold;
   b) calculating shrinkage of the part as a function of cooling time;
   c) calculating friction forces between the part and the mold;
   d) calculating ejection forces on the part based on the coefficient of friction and the earlier calculated shrinkage;
   e) calculating induced stress on selected high stress areas in the part; and
   f) comparing the induced stress with the material yield stress to determine an optimal cycle time window within which the part can be ejected without being damaged.

6. The method of claim 5 in which steps (a) through (e) are repeated several times for different cooling times.

7. The method of claim 5 in which the selected high stress areas are stressed by ejector pins in the mold.

8. The method of claim 5 in which the optimal cycle time window includes upper and lower limits between which the part can be ejected without being damaged.

9. The method of claim 5 in which the optimal cycle time window includes a lower limit after which the part can be ejected without being damaged.

10. The method of claim 6 in which the selected high stress areas are stressed by ejector pin in the mold.

11. The method of claim 6 in which the optimal cycle time window includes upper and lower limits between which the part can be ejected without being damaged.

12. The method of claim 6 in which the optimal cycle time window includes a lower limit after which the part can be ejected without being damaged.

13. The method of claim 7 in which the optimal cycle time window includes upper and lower limits between which the part can be ejected without being damaged.

14. The method of claim 7 in which the optimal cycle time window includes a lower limit after which the part can be ejected without being damaged.

* * * * *

UNITED STATES PATENT AND TRADEMARK OFFICE
CERTIFICATE OF CORRECTION

PATENT NO. : 6,572,796 B1
DATED : June 3, 2003
INVENTOR(S) : Dong-Ming Gao et al.

It is certified that error appears in the above-identified patent and that said Letters Patent is hereby corrected as shown below:

<u>Title page,</u>
Item [57], ABSTRACT,
Line 7, replace "shrinkage calculating" with -- shrinkage, calculating --

<u>Column 1,</u>
Line 21, replace "increased friction force" with -- increased ejection force --

<u>Column 4,</u>
Line 40, replace "Fejection = Ffriction = _Fnormal" with -- Fejection = Ffriction = $\mu$Fnormal --
Line 43, add -- where $\mu$ is the coefficient of friction -- after the word "cooling".

Signed and Sealed this

Eighteenth Day of November, 2003

JAMES E. ROGAN
*Director of the United States Patent and Trademark Office*